(12) United States Patent
Kobayashi et al.

(10) Patent No.: US 8,365,756 B2
(45) Date of Patent: Feb. 5, 2013

(54) FUEL TANK VALVE DEVICE

(75) Inventors: Yasutomo Kobayashi, Yamato (JP);
Takeshi Kojima, Machida (JP)

(73) Assignee: Nifco Inc., Yokohama-Shi (JP)

( * ) Notice: Subject to any disclaimer, the term of this patent is extended or adjusted under 35 U.S.C. 154(b) by 400 days.

(21) Appl. No.: 12/451,044

(22) PCT Filed: Apr. 25, 2008

(86) PCT No.: PCT/JP2008/058074
§ 371 (c)(1),
(2), (4) Date: Dec. 3, 2009

(87) PCT Pub. No.: WO2008/136411
PCT Pub. Date: Nov. 13, 2008

(65) Prior Publication Data
US 2010/0108155 A1    May 6, 2010

(30) Foreign Application Priority Data
Apr. 26, 2007    (JP) .................................. 2007-117511

(51) Int. Cl.
*F16K 24/04* (2006.01)
(52) U.S. Cl. ............................................ 137/202; 137/43
(58) Field of Classification Search .................... 137/39, 137/43, 202, 587; 141/198
See application file for complete search history.

(56) References Cited

U.S. PATENT DOCUMENTS

| | | | |
|---|---|---|---|
| 4,753,262 A | 6/1988 | Bergsma | |
| 5,497,800 A * | 3/1996 | Ohashi et al. | 137/587 |
| 5,755,252 A * | 5/1998 | Bergsma et al. | 137/202 |
| 5,944,044 A * | 8/1999 | King et al. | 137/202 |
| 5,960,816 A * | 10/1999 | Mills et al. | 137/202 |
| 5,996,607 A * | 12/1999 | Bergsma et al. | 137/202 |
| 6,085,771 A * | 7/2000 | Benjey et al. | 137/202 |
| 6,240,950 B1 * | 6/2001 | Harris | 137/202 |
| 6,405,747 B1 | 6/2002 | King et al. | |
| 6,564,821 B1 * | 5/2003 | Orenstein et al. | 137/202 |
| 6,564,822 B2 * | 5/2003 | Muto et al. | 137/202 |
| 6,901,943 B2 * | 6/2005 | Yamada et al. | 137/202 |
| 6,941,966 B2 * | 9/2005 | Mori et al. | 137/202 |
| 6,994,103 B2 * | 2/2006 | Takahashi et al. | 137/202 |
| 7,963,296 B2 * | 6/2011 | Kaneko | 137/202 |
| 2006/0108000 A1 | 5/2006 | Kaneko et al. | |
| 2007/0295403 A1 | 12/2007 | Kishi | |

FOREIGN PATENT DOCUMENTS

| | | |
|---|---|---|
| JP | H07-279789 | 10/1995 |
| JP | H08-225022 | 9/1996 |
| JP | 2006-234159 | 9/2006 |
| JP | 2006-321468 | 11/2006 |
| JP | 2007-016891 | 1/2007 |
| JP | 2007-092834 | 4/2007 |

* cited by examiner

*Primary Examiner* — Craig Schneider
*Assistant Examiner* — Craig J Price
(74) *Attorney, Agent, or Firm* — Manabu Kanesaka

(57) ABSTRACT

A valve body and a float body are coupled so that the valve body is allowed to move in a direction along a central axis of movement of the float body, and the seated valve body is unseated when the float body descends. On a central axis side of the movement of the float body, a pair of guide members is provided, and when the valve body tilts, the valve body and the float body contact each other on a lower side of a tilt of the valve body and the float body ascends, so that the guide members correct the tilt. Also, when the float body ascends, the float body and the valve body do not contact each other in a rest of a portion.

10 Claims, 12 Drawing Sheets

FUEL TANK VALVE DEVICE

FIELD OF TECHNOLOGY

The invention relates to a valve device which is provided in a ventilation path communicating the inside and the outside of a fuel tank, and used for preventing inflow of fuel from entering beyond the valve device.

BACKGROUND ART

As for a liquid-level control valve of the fuel tank, there is one, as shown in FIG. 16, in which a valve member 101 engages the upper part of a float 100 so as to be relatively movable. Also, by a projection 100a formed in the middle of the upper part of this float 100, the valve member 101 is pushed upward, and the valve member 101 abuts against a seat portion 103 provided in a ventilation path connected to a canister. In this abutted state, such ventilation path is blocked. (See Patent Document 1)

However, as for such a control valve, firstly, although the valve member 101 is supported by the projection 100a, when the float 100 ascends, if the valve member 101 inclines, the float 100 first contacts the seat portion 103 on the upper side of the tilt of the valve member 101. Then, in this case, although the lower side of the tilt of the valve member 101 is eventually raised and the posture of the valve member 101 is corrected, this correction is accomplished by contacting an inner face of the projection 101a positioned on the lower side of the tilt of the valve member 101 and a marginal portion 100b of an upper head portion of the float 100 far from the center of the float 100. As a result, in this case (FIG. 16), a force required for completely contacting the valve member 101 with the seat portion 103 excessively increases.

Also, secondly, if the liquid level descends from a state wherein the ventilation path is blocked, the float 100 descends, and at this time, the marginal portion of the upper head portion of the float 100 is caught by the projection 101a of the valve member 101. Accordingly, the valve member 101 is pulled away from the seat portion. However, if a force for sticking to the seat portion 103 is acted on the valve member 101, such as that the inside of the fuel tank has a high pressure, and the like, it was difficult for the valve member 101 to be immediately pulled away from the seat portion 103 due to the descent of the float 100, and for the ventilation path to be unblocked responsively when the liquid level descended.

Patent Document 1: Japanese Unexamined Patent Application Publication No. H07-279789

DISCLOSURE OF THE INVENTION

Problems to be Solved by the Invention

The main subject the invention attempts to solve is, firstly, to make it possible for a valve body to be seated by correcting a tilt of a float body by a necessity minimum force toward the upper part when the float body is raised in a state wherein the valve body is engaged and combined in a state such that the float body can move upward and downward.

Also, secondly, as for a valve device (valve) using this kind of a float body, in the case that a liquid level of a fuel inside a fuel tank is lowed to a predetermined height, the main subject the invention attempts to solve is to make it possible to responsively change to an opening valve condition and unblock a blocked condition of a ventilation path.

Means for Solving the Problems

The first subject is solved by providing a fuel tank valve device with the following structures (1) to (7).

(1) A valve device provided in a ventilation path communicating the inside and the outside of a fuel tank, comprising, (2) a float body provided with a valve body on the upper part;

(3) a housing chamber comprising a part of said ventilation path housing the float body to be movable upward and downward;

(4) a valve seat comprising a part of said ventilation path which closes a valve by allowing the seating of said valve body by an ascent of the float body due to the inflow of fuel to the housing chamber; and (5) wherein the valve body and the float body are combined so that the valve body can move in a direction along a central axis of a movement of the float body, and that said seated valve body is unseated when the float body descends, (6) wherein a pair of guide means is provided on a central axis side of the movement of the float body, said guide means contacting the lower side of the tilt of this valve body when there is the tilt on the valve body, thereby correcting the tilt by the ascent of the float body, and (7) when the float body ascends, the float body and the valve body do not contact each other in the rest of the portion.

Although the valve body also ascends when the float body ascends due to the inflow of the fuel to the housing chamber, at this time, if there is the tilt on the valve body, the valve body contacts one side of the valve seat in advance. As a result, as a fulcrum of this side, the other side of the valve seat is lifted up by the float body so that the tilt of the float body is corrected, and the valve body is completely seated on the valve seat. Since said guide means are provided on the central axis side of the movement of the float body, when the tilt exists on the valve body, the valve body and the float body contact each other at a position close to said fulcrum without increasing a frictional force so that said tilt can be corrected.

Also, said second subject can be solved by providing the fuel tank valve device with the additional following structures (1) and (2).

(1) The valve body and the float body are combined by respectively engaging two or more engaging portions provided on one of the valve body and the float body with engaged portions provided on the other of the valve body and the float body in a condition that the valve body can move upward and downward, and (2) no engaging portion is provided at a position opposite to a position where at least one engaging portion among these engaging portions is provided, relative the central axis of the movement of the float body.

At the descending position of the float body, the valve body is supported by the float body. If the fuel flows into the housing chamber comprising a part of the ventilation path, the float body and the valve body ascend together and close the valve seat. (Closed valve) If the fuel flows out of the housing chamber from this state, since the valve body and the float body are engaged and combined in a state wherein the valve body can move upward and downward, when the float body descends, the valve body supported by this also descends so that the valve seat is opened. If the float body descends to a position wherein one engaging portion is caught by the engaged portion, the valve body is tilted with this one engaging portion side tilting down. On this side, the valve body can be widely separated away from the valve seat at an early stage of the descent of the float body. Accordingly, when the fuel flows out of the housing chamber, at the same time, the valve seat can be opened with excellent responsiveness so that the fuel tank can be in a condition of being ventilatable to the outside. Also, there is a case that if the inside of the fuel tank has a high pressure, the valve body is pressed against the valve seat so that it is difficult for the valve body to be unseated. However, even in such a case, the valve seat can be opened smoothly by tilting the valve body due to the descending of the float body.

Effect of the Invention

According to such a valve device of this invention, due to said guide means, when the float body ascends in a state wherein the valve body is tilted, it is possible to correct the tilt of the float body by a required minimum upward force and make this valve body seat on the valve seat.

Also, in the case that the liquid level of the fuel inside the fuel tank is lowered to a predetermined height, it is possible to become an open valve state and release a closed state of the ventilation path with an excellent responsiveness.

BEST MODES OF CARRYING OUT THE INVENTION

Hereinafter, best modes of carrying out the invention is explained based on FIG. 1 to FIG. 15.

Figure 10:
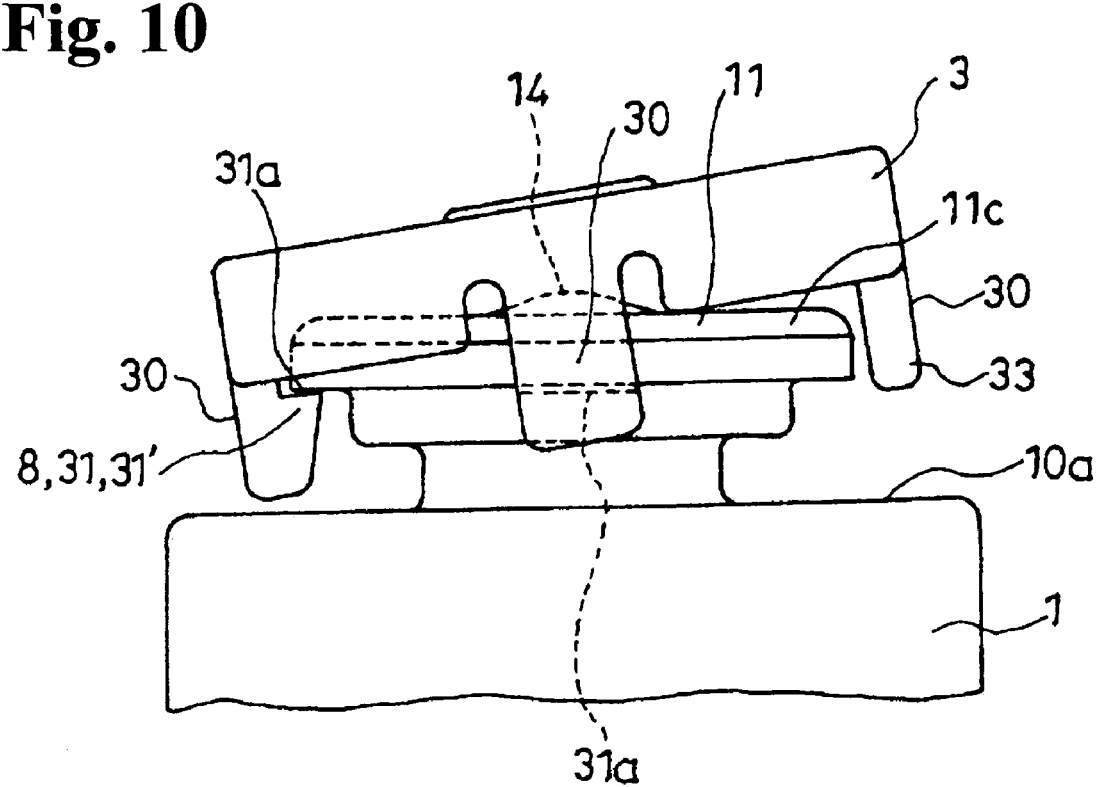
FIG. 10 is a side view showing a tilted state of the valve body according to another embodiment.
Figure 11:
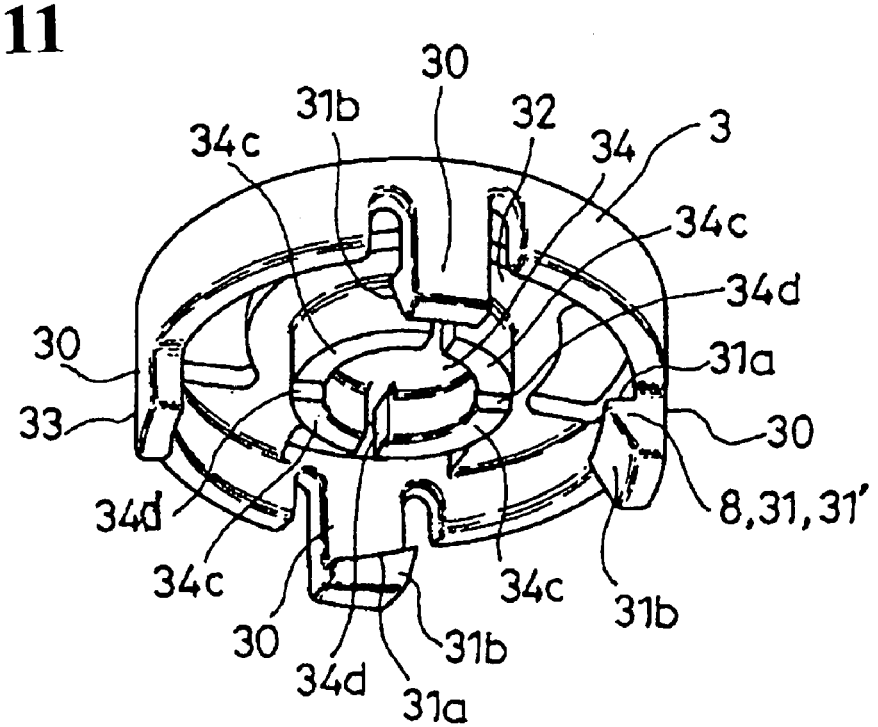
FIG. 11 is a perspective view of the same valve body.
Figure 12:
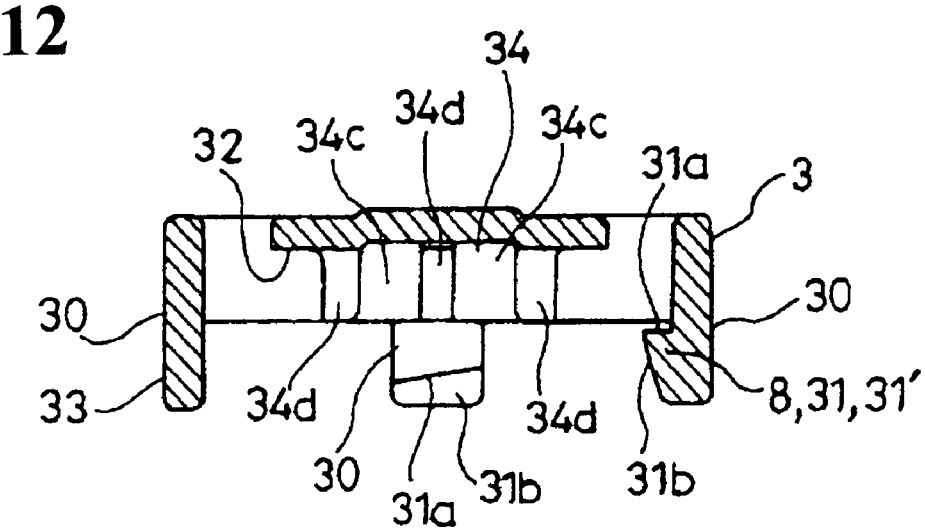
FIG. 12 is a cross sectional view of the same.
Figure 13:
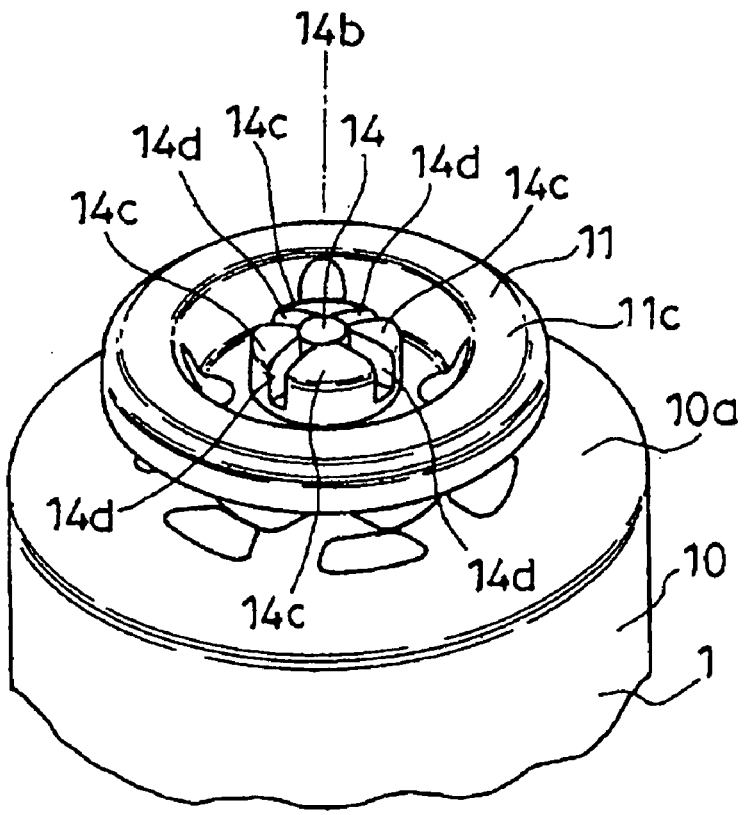
FIG. 13 is a perspective view of essential parts of the float body according to another embodiment.
Figure 14:
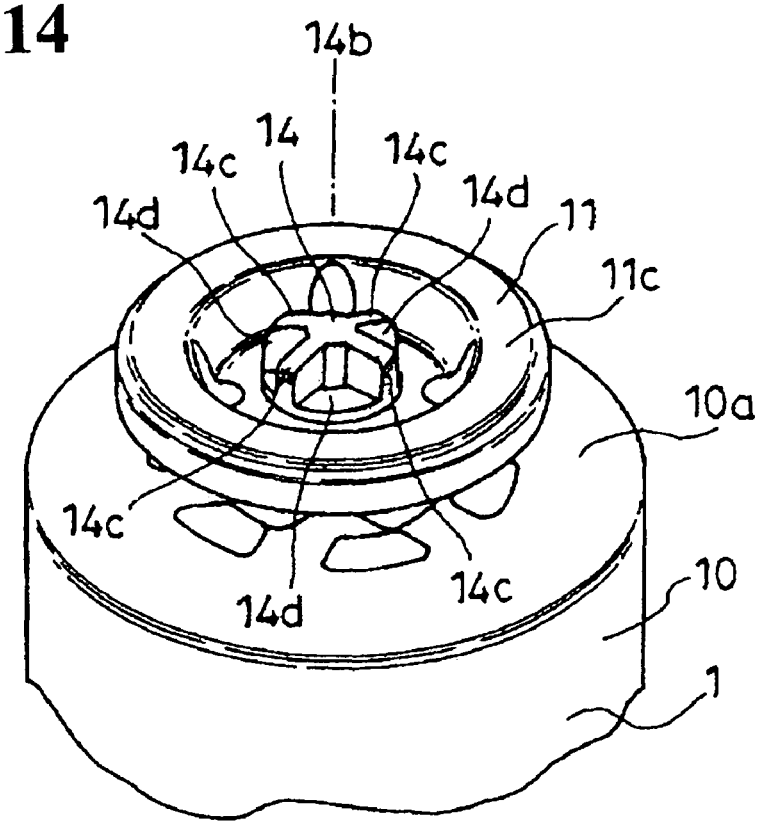
FIG. 14 is a perspective view of the essential parts of the float body according to a further embodiment.
Figure 15:
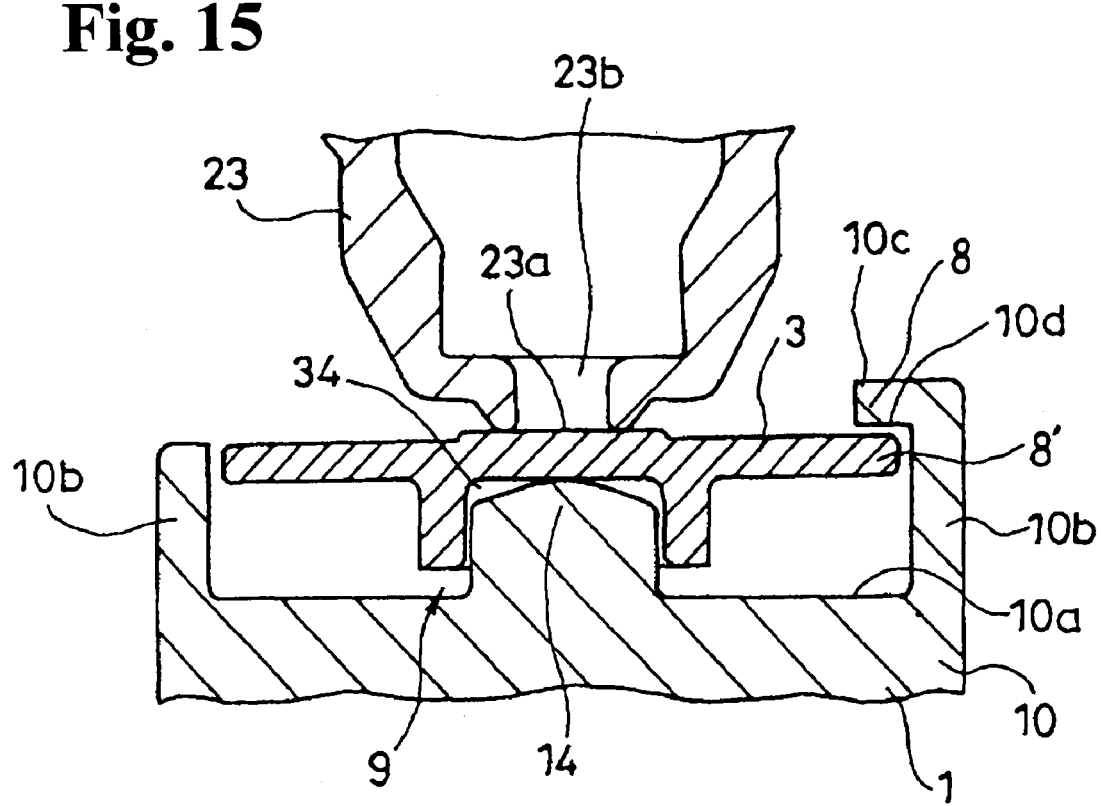
FIG. 15 is a sectional structural view of essential parts of an example in which a part of both structures of the valve body and the float body is made differently.
Figure 16:
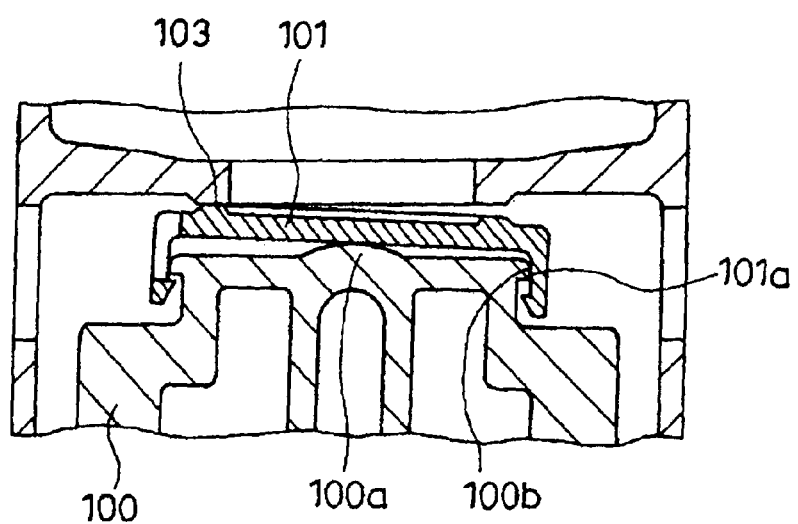
FIG. 16 is a sectional structural view showing inconvenience of a conventional example.

Incidentally, FIG. 1 to FIG. 9 show one of embodiments of a valve device according to the invention; FIGS. 10 to 12 show an example in which a part of a structure of a valve body according to a structural example shown in FIG. 1 to FIG. 9 is changed; FIG. 13 shows an example in which a part of a structure of a float body 1 according to the embodiment shown in FIG. 1 to FIG. 9 is changed; FIG. 14 shows an another example in which a part of the structure of the float body 1 according to the embodiment shown in FIG. 1 to FIG. 9 is changed; and FIG. 15 shows an example in which a part of both structures of the valve body 3 and the float body 1 according to the embodiment shown in FIG. 1 to FIG. 9 is changed, respectively.

Figure 1:
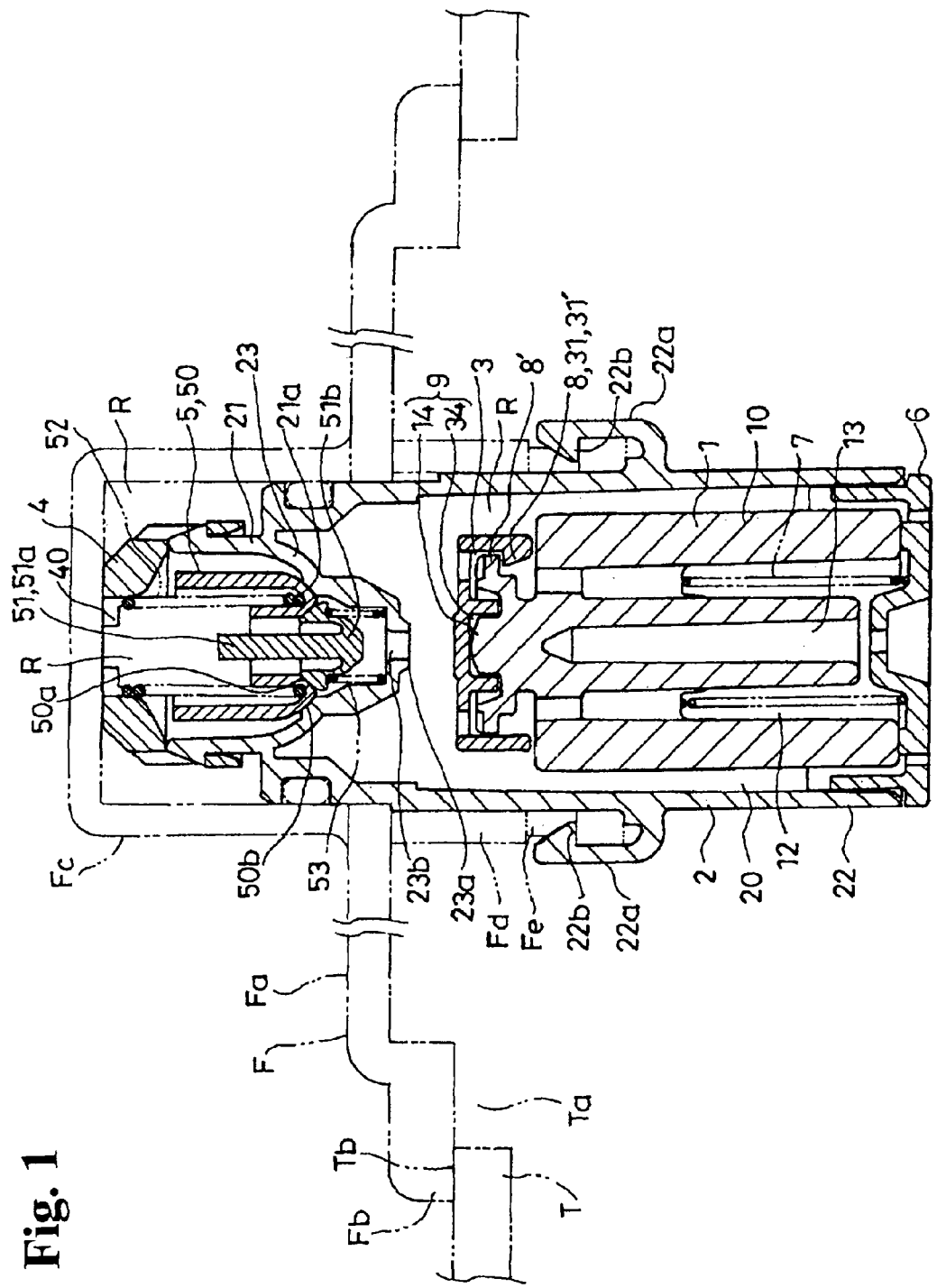
FIG. 1 is a sectional structural view showing the condition of a valve device in use.
Figure 2:
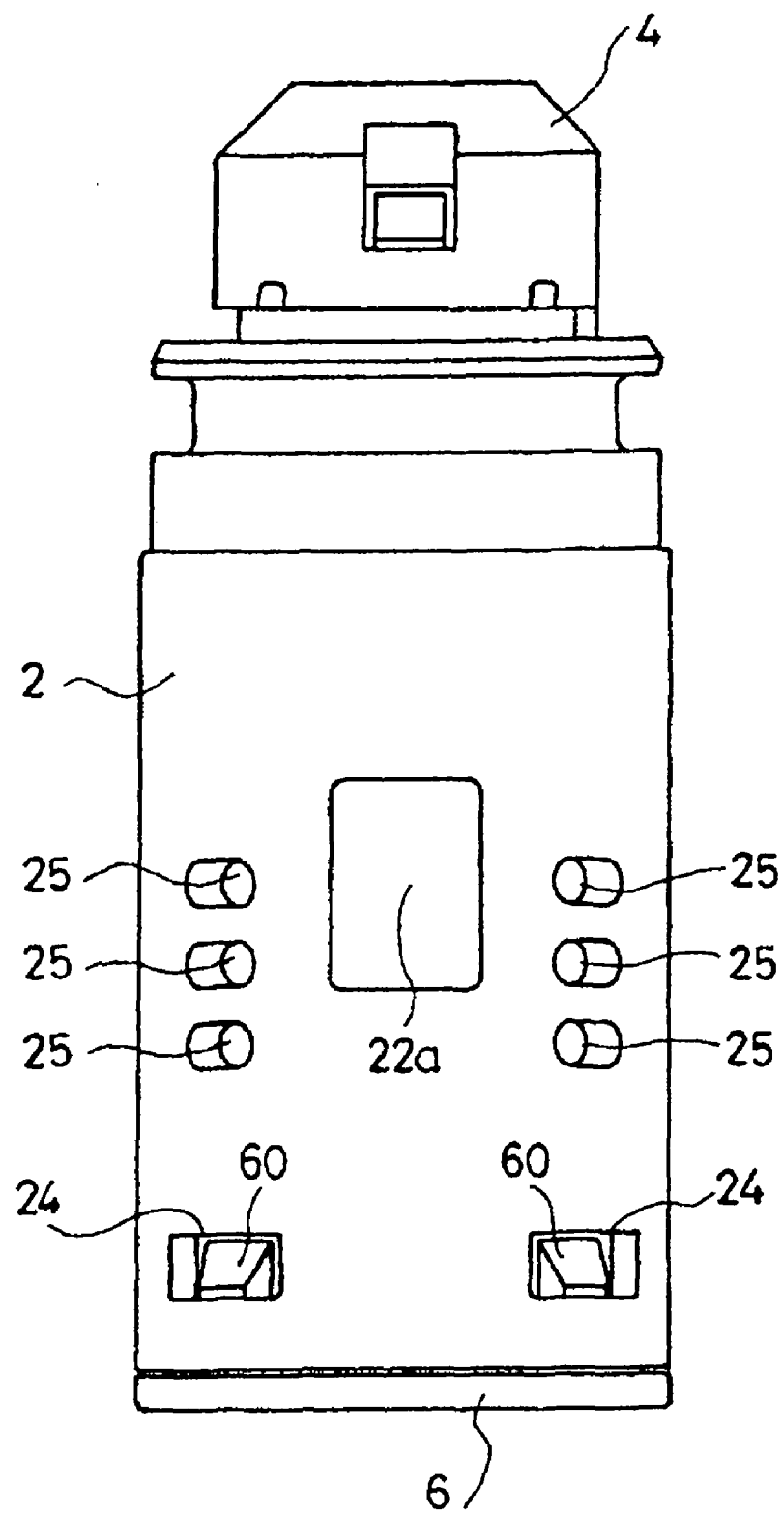
FIG. 2 is a side view of the valve device.
Figure 3:
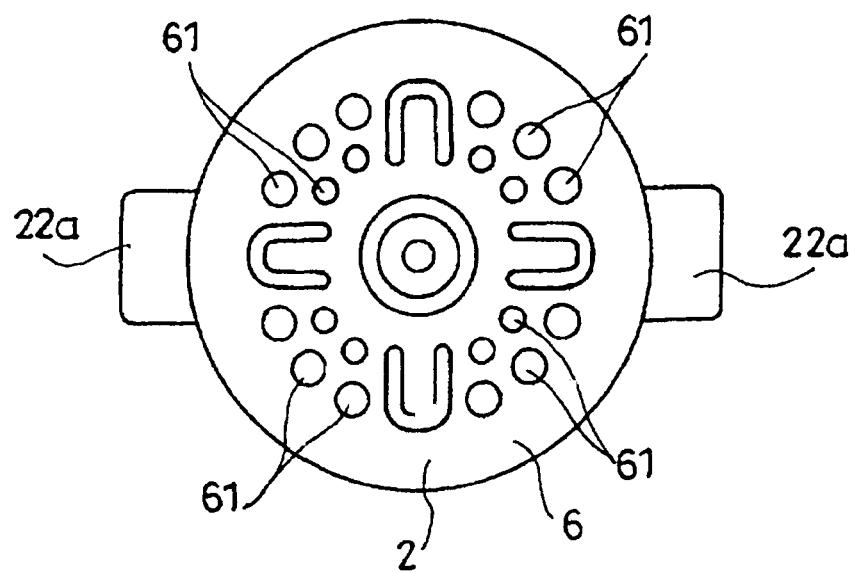
FIG. 3 is a bottom view of the same.
Figure 4:
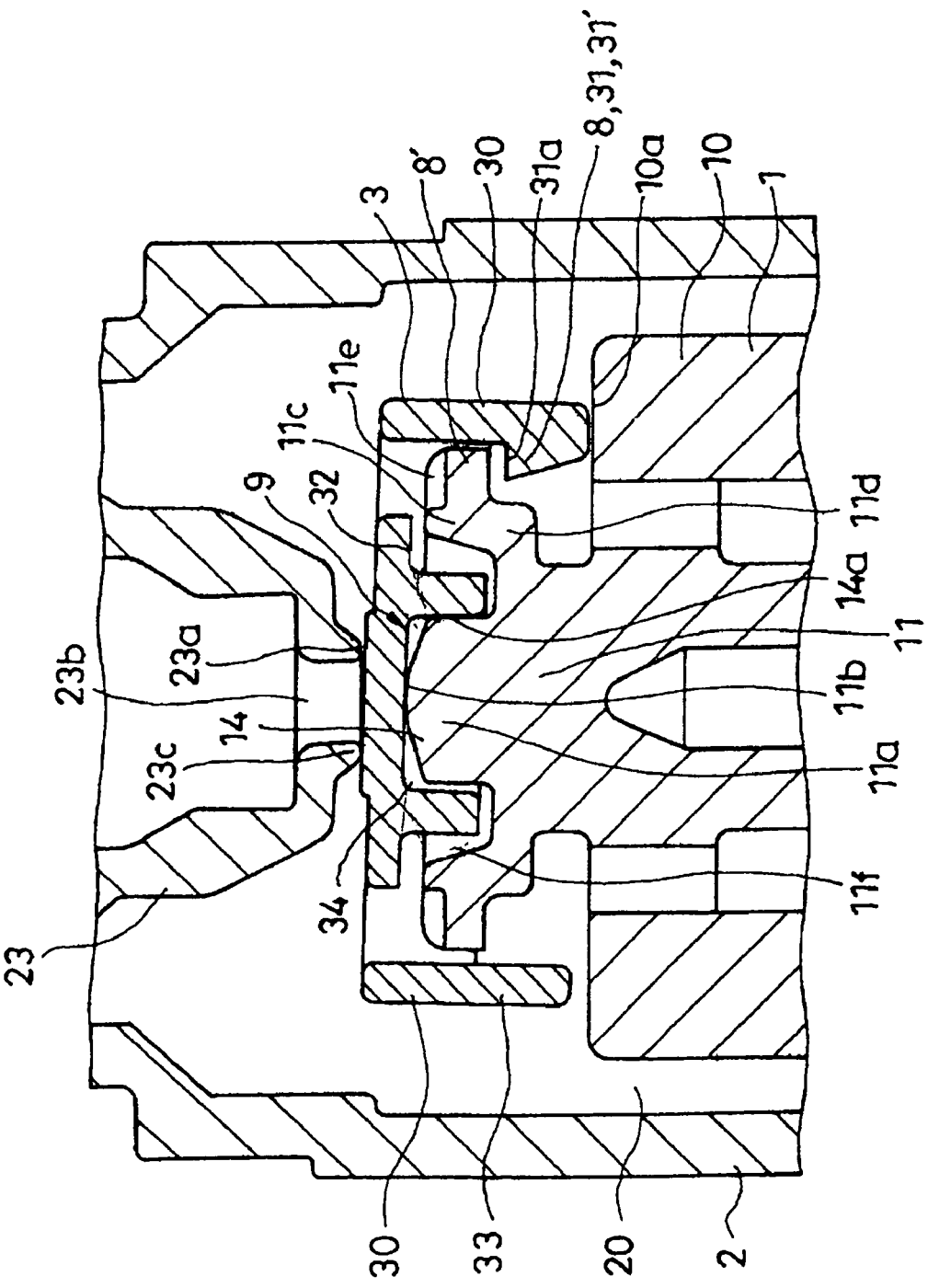
FIG. 4 is a sectional structural view of essential parts of the valve device (A check valve is omitted).
Figure 5:
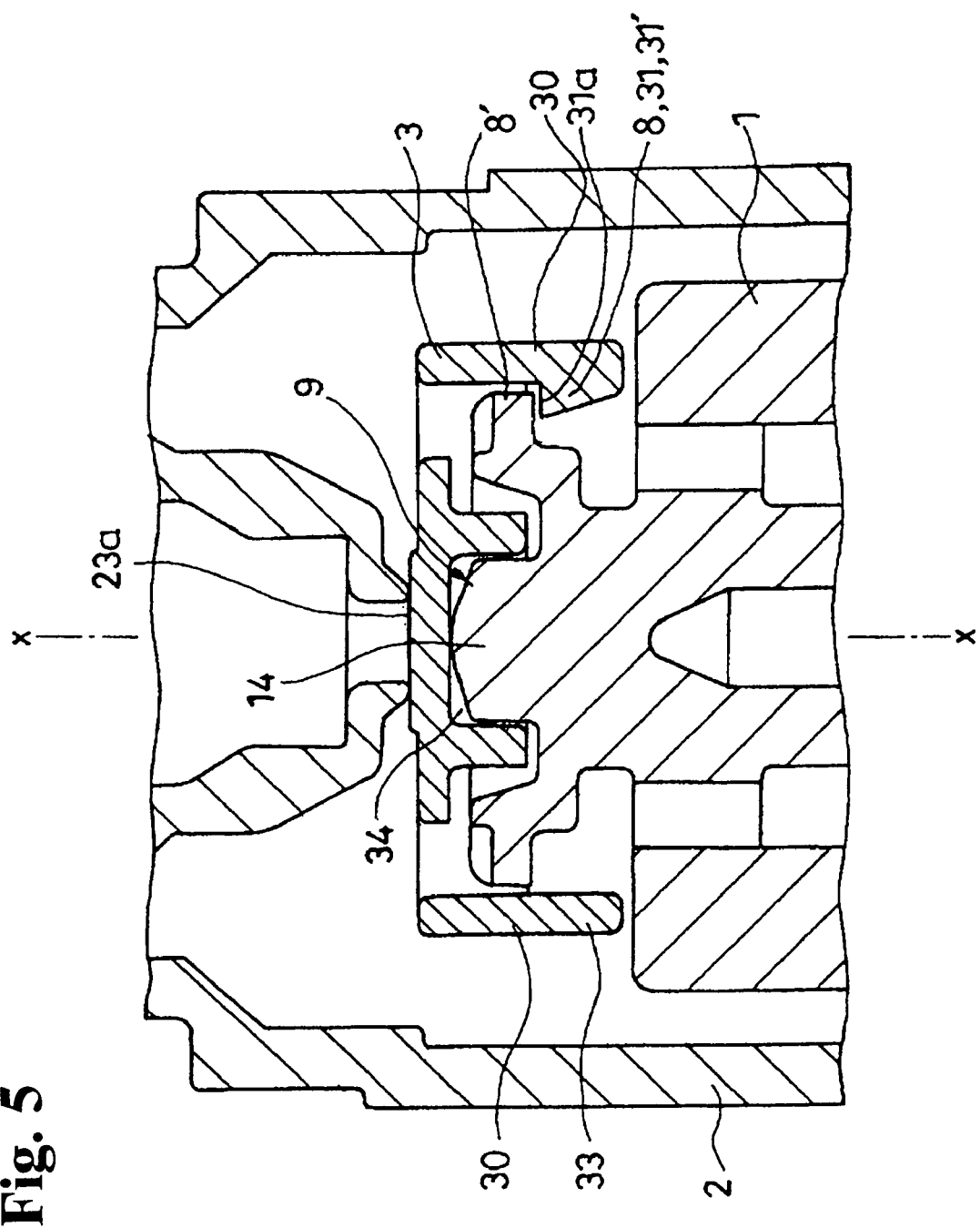
FIG. 5 is a sectional structural view of the essential parts of the valve device (The check valve is omitted).
Figure 6:
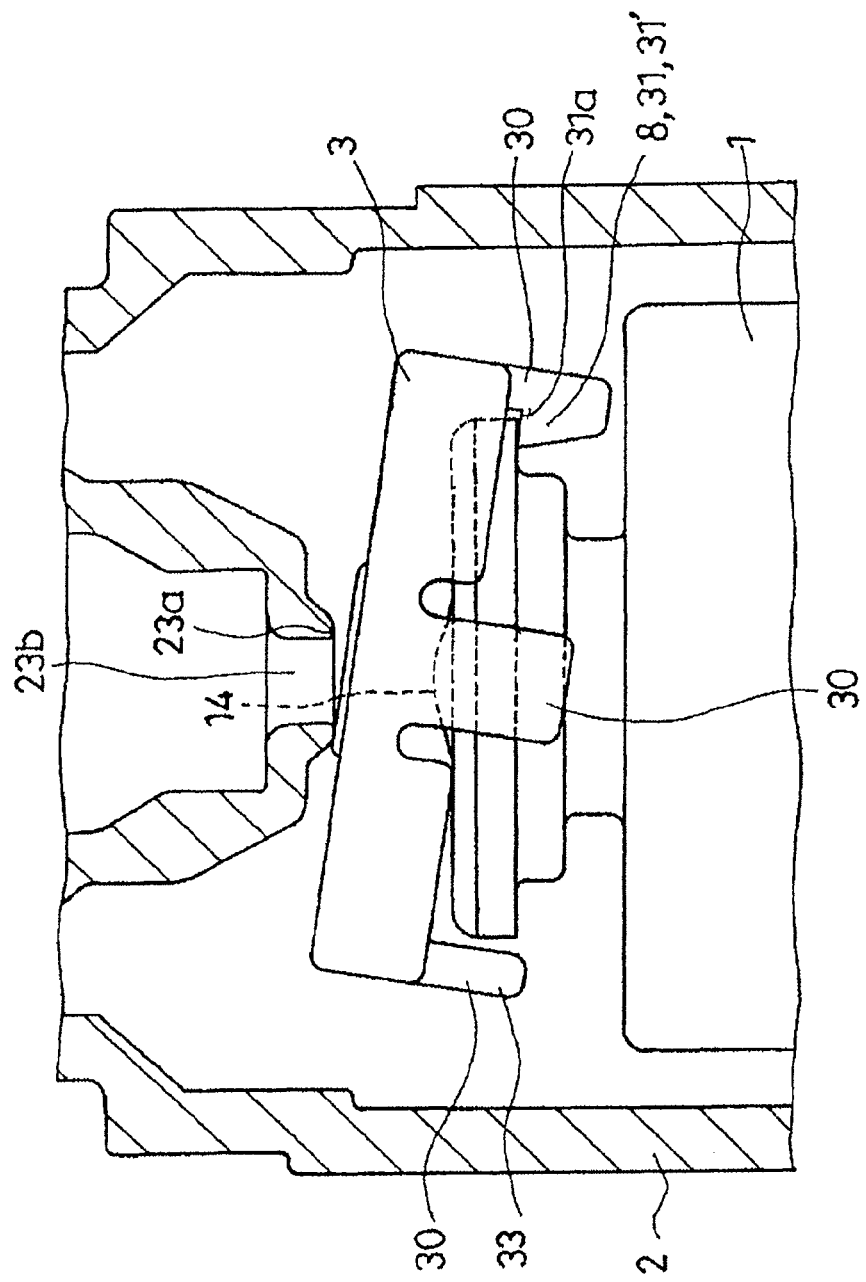
FIG. 6 is a sectional structural view of the essential parts of the valve device (The check valve is omitted).
Figure 7:
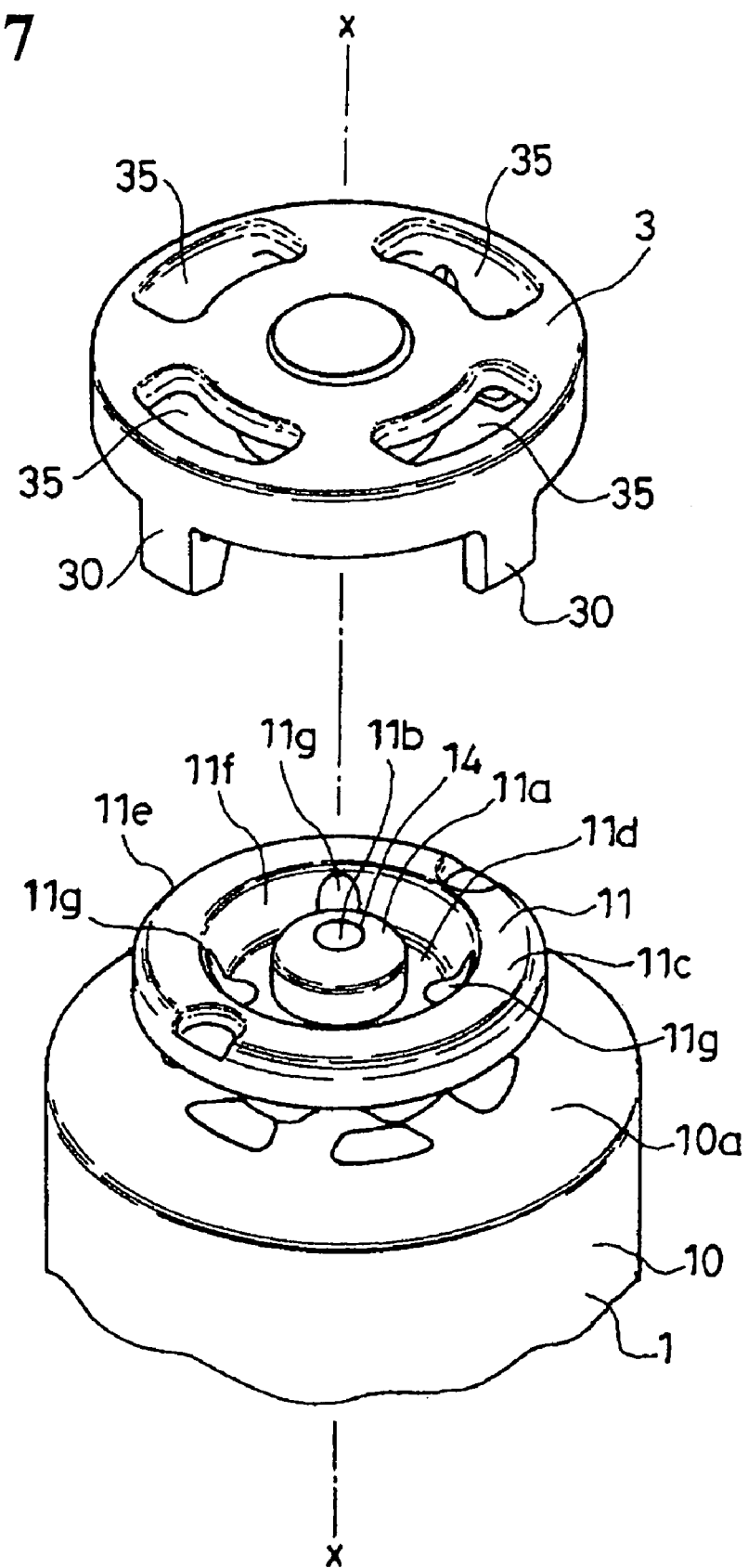
FIG. 7 is an exploded perspective view of a valve body and a float body.
Figure 8:
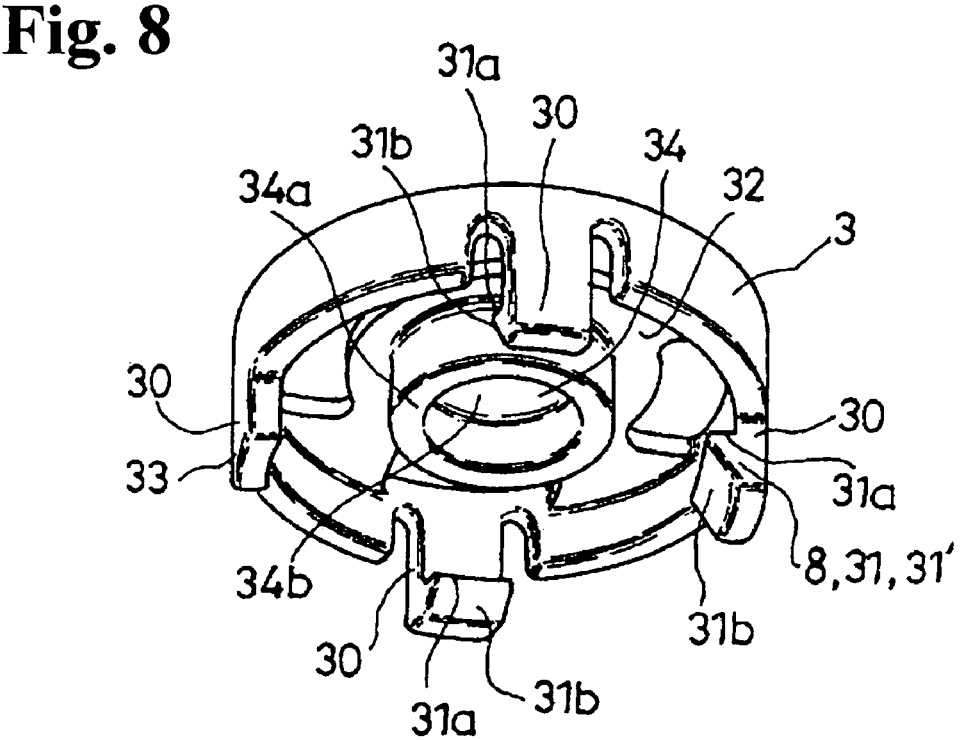
FIG. 8 is a perspective view of the valve body.
Figure 9:
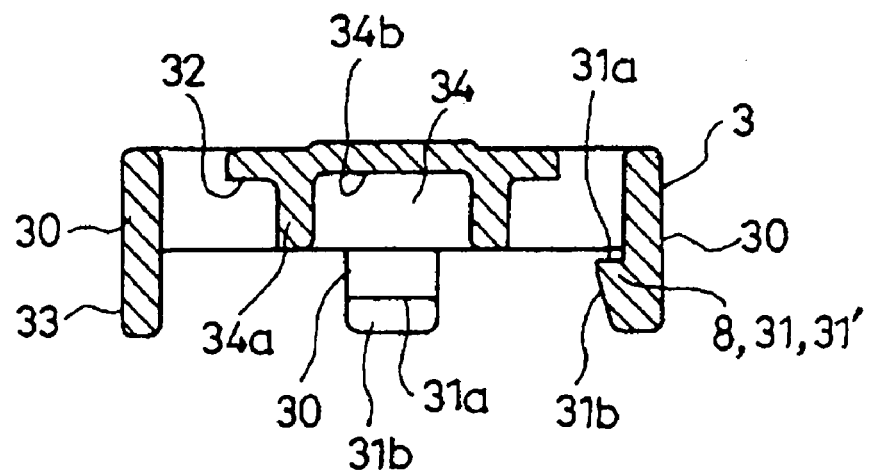
FIG. 9 is a cross sectional view of the same.

As for FIG. 1 to FIG. 9, FIG. 1 shows a cross section of a whole structure of the valve device in a state wherein the float body 1 is in a descending position; FIG. 2 shows the valve device viewing from a side face; and FIG. 3 shows the valve device viewing from a bottom face, respectively. FIG. 4 shows a state wherein an obliquely upward side of the valve body 3 hits a valve seat 23a by ascending the float body 1 in a condition that the valve body 3 is tilted; FIG. 5 shows a state wherein a valve of the valve seat 23a is closed by correcting a posture of the valve body 3 due to an upward force acted on the float body 1 from the state in FIG. 4; and FIG. 6 shows a state immediately after the valve of the valve seat 23a is opened by tilting the valve body 3 due to the descending of the float body 1 from the state in FIG. 5, respectively. Also, FIG. 7 shows a state wherein the valve body 3 and the float body 1 are separated; and FIG. 8 and FIG. 9 show such valve body 3, respectively.

Also, as for FIG. 10 to FIG. 12, FIG. 10 shows a state immediately after the float body 1 in which the valve body 3 is seated on the valve seat 23a starts to descend by showing only the float body 1 and the valve body 3; and FIG. 11 and FIG. 13 show such valve body 3.

A fuel tank valve device according to the mode of working is provided in a ventilation path R communicating the inside and the outside of a fuel tank T, and basically, is used for preventing the inflow of the fuel to the ventilation path R from entering beyond the valve device in such a case that the liquid level of the fuel inside the fuel tank T ascends to a predetermined height by fueling, the tilt of a vehicle and the like.

Typically, such a valve device is usually in a valve-open state and moves to a valve-closed state under such a condition in which the fuel happens to break into the ventilation path R beyond the valve device due to the fueling, the tilt of the vehicle and the like. When this condition disappears, the valve device moves to the valve-open state again. Thereby, such a valve device can be used as a vent valve controlling the uppermost limit of the fueling to the fuel tank T, a cut valve maintaining a pressure inside the fuel tank T within a certain definite range and provided on the ventilation path R, and the like. Such a ventilation path R typically connects a canister and the fuel tank T.

Such a valve device is provided with the float body 1, a housing chamber 20, and the valve seat 23a.

In the illustrated example, the valve seat 23a is formed in a dividing wall 23 of a cylindrical case 2 provided with a cylindrical upper portion 21 and a cylindrical lower portion 22 which is wider than the cylindrical upper portion 21 and dividing between the cylindrical upper portion 21 and the cylindrical lower portion 22 by the dividing wall 23. In the illustrated example, the dividing wall 23 is formed in a dome projecting downward, and the inside of the dome becomes a part of the inner wall of the cylindrical upper portion 21 and the outside of the dome becomes a part of the inner wall of the cylindrical lower portion 22. The valve seat 23a is constituted by providing a through hole 23b which becomes a part of the ventilation path R in the middle of the lower part of this dividing wall 23. On the outside of the dome of the dividing wall 23, the through hole 23b is edged with a circular rib 23c. At the upper end of the cylindrical upper portion 21, an upper cap 4 is attached.

In this illustrated example, inside such a cylindrical upper portion 21, a check valve 5 is housed.

Such a check valve 5 is constituted by:
a first valve member 50 with an cylindrical shape;
a second valve member 51 in which a leg portion 51a is put into the first valve member 50 from a lower end opening 50a of the first valve body 50 and a head portion 51b is positioned on the lower side of the lower end opening 50a;

an upper compression spring 52 as an urging means which is placed between the upper cap 4 and the lower-end inside portion of the first valve body 50, and presses a circular shoulder portion 50b circling the lower end opening 50a of the first valve body 50 against a circular step surface 21a facing the upper part of the cylindrical upper portion 21 at a position upper than said valve seat 23a in an air-tight state by a predetermined force; and a lower compression spring 53 as an urging means which is placed between the dividing wall 23 and the head portion 51b of the second valve body 51, and presses the head portion 51b of the second valve body 51 against the lower end opening 50a of the first valve body 50 in the air-tight state by the predetermined force.

Also, the lower end of the cylindrical lower portion 22 of the cylindrical case 2 is closed by a lower cap 6 assembled by engaging engagement claws 60 with engagement windows 24 of the cylindrical case 2. The float body 1 is housed inside the cylindrical lower portion 22 of the cylindrical case 2 which is closed by the lower cap 6 to be movable upward and downward. Specifically, in the illustrated example, the cylindrical lower portion 22 of such cylindrical case 2 functions as the housing chamber 20 which houses the float body 1 to be movable upward and downward and is a part of said ventilation path R. In the center of the upper cap 4, a through hole 40 is formed, and in the lower cap 6, plural through holes 61, 61 . . . are formed. In the illustrated example, plural through holes 25, 25 . . . are also formed on side portions of the cylindrical case 2.

Also, in the illustrated example, in a position of approximately the middle of the upward and downward directions of the cylindrical lower portion 22 of the cylindrical case 2, attachment arms 22a are provided so as to respectively extend upward on both sides of a radial direction, leaving a space between the external surface of the cylindrical lower portion 22. Also, the attachment arms 22a are provided with engagement claws 22b on the inside of the upper end portion. In the illustrated example, the valve device is attached to the fuel tank T through a flange body F provided in the middle of a circular disc portion Fa with an upper portion Fc projecting from the upper face of the circular disc portion Fa and a lower portion Fd projecting from the lower face of the circular disc portion Fa and opening the lower end of the lower portion Fd. Specifically, at the lower end of the lower portion Fd of the flange body F, engagement windows Fe of the engagement claws 22b of said attachment arms 22a are formed. In a process that the cylindrical case 2 enters into a position wherein the upper cap 4 becomes closer to the inner face of the upper portion Fc of the flange body F than the lower portion Fd of the flange body F, such engagement claws 22b enter into the engagement windows Fe from the outside by a recoil force of the attachment arms 22a so that the flange body F and the valve device are assembled. Thus, the flange body F assembled with the valve device is assembled so as to cover an attachment opening Ta which is provided in the fuel tank T from the upper side and from the outside of the fuel tank T. An opening border Tb of the attachment opening Ta and an external border Fb of the circular plate portion Fa of the flange body F are welded. Accordingly, the valve device is attached to such a fuel tank T in a state wherein the housing chamber 20 which houses the cylindrical lower portion 22 of the cylindrical case 2, i.e., the float body 1, is positioned inside the fuel tank T, and wherein the cylindrical upper portion 21, i.e., said check valve 5 is positioned on the outside of the fuel tank T. Incidentally, the opening border Tb of the attachment opening Ta and the outer border Fb of the circular plate portion Fa of the flange body F may be connected with a screw by sandwiching a sealing material therebetween.

The upper portion Fc of the flange body F is connected to the canister (not shown). Therefore, the inside of the cylindrical case 2 constitutes a part of said ventilation path R. In the illustrated example, when the inside of the fuel tank T becomes a high pressure which pushes up the first valve body 50 against an urging force of said upper compression spring 52, said circular shoulder portion 50b of the first valve body 50 is separated from said circular step surface 21a, and allows gas inside the fuel tank T to escape to the outside of the fuel tank T. On the other hand, when the inside of the fuel tank T becomes a low pressure which pushes down the second valve body 51 against an urging force of said lower compression spring 53, said head portion of the second valve body 51 is separated from said lower end opening 50a of the first valve body 50, and allows to introduce air into the fuel tank T.

The float body 1 includes the valve body 3 on the upper part. When the fuel flows into said housing chamber 20, the float body 1 ascends; the valve body 3 is seated on the valve seat 23a which constitutes apart of said ventilation path R; and the valve is closed. Accordingly, the ventilation path R is closed so that the fuel cannot enter into the ventilation path R beyond the valve seat 23a.

In the illustrated example, the float body 1 includes a main body portion 10 forming a circular cylinder shape and a head portion 11 formed in the upper end of the main body portion 10. The head portion 11 includes an axis portion 11a projecting along a central axis x of the movement of the float body 1 from the approximately center of an upper end face 10a of the main body portion 10; and a circular jaw portion 11c formed between an end 11b of the axis portion 11a and a base portion. The circular jaw portion 11c further includes a central portion 11d and an outer border portion 11e positioned on the upper part of the central portion 11d. Between the two, a circular groove portion 11f is formed.

The float body 1 also includes a circular hole 12 including a circular opening circling the central axis x of the movement on the lower end surface, and continuing to the approximately middle of the upward and downward direction of the float body 1; and a central hole 13 positioned on an axial line of the central axis x of the movement and opening on the lower end face of the float body 1. In the illustrated example, due to a compression coil spring 7 which enters in the circular hole 12, and whose upper end of the spring contacts the deep inner portion of the circular hole 12, and also whose lower end of the spring contacts the lower cap 6, a certain urging force is acted in advance upwardly on the float body 1 which is in a descending position wherein the valve body 3 is unseated from the valve seat 23a, and whose lower end contacts the lower cap 6.

(FIG. 1)

In this mode of working, such a valve body 3 and the float body 1 are coupled by respectively engaging two or more engaging portions 8 provided in one of the valve body 3 and the float body 1 with engaged portions 8' provided on the other of the valve body 3 and the float body 1 in a state wherein the valve body 3 can move upward and downward.

No engaging portion 8 is provided at a position opposite to a position where at least one engaging portion 8 among these engaging portions 8 is provided, relative the central axis x of the movement of the float body 1.

Also, when the float body 1 descends, one engaging portion 8 of two or more engaging portions 8 is caught by the engaged portion 8' earlier than the other engaging portions 8 so that the valve body 3 is tilted. Moreover, the tilt of the valve body 3 is controlled by the other engaging portions 8.

In the illustrated example, the valve body 3 has a circular plate shape and is constituted so as to ascend together with the ascent of the float body 1, and the central part of the upper face is seated on the circular rib 23c of the valve seat 23a so as to close the valve of the valve seat 23a. On the lower face side of the valve body 3, plural leg portions 30 projecting downward from the marginal portion thereof are provided. In the illustrated example, the four leg portions 30 are provided so that one of the leg portions 30 is provided at every 90 degrees in a circular direction of the valve body 3. In the illustrated example, engagement claws 31 are formed in three of the leg portions 30 at the inside the end sides of the leg portions 30, and facing engaging surfaces 31a upward. Also, in the valve body 3, formation windows 35 of the engagement claws 31 are provided in positions for forming the leg portions 30. The valve body 3 and the float body 1 are combined such that the engagement claws 31 are always positioned between said head portion 11 and the upper end face 10a of the main body portion 10. Specifically, each engagement claw 31 includes a tilting surface 31b on the lower side which tilts in a direction of making an up-down dimension of the engagement claw 31 thin as moving to the side of the engaging surface 31a. Also, the engagement claw 31 is positioned such that the end of each engagement claw 31 contacting the tilting surface 31b with the engaging surface 31a is positioned in a circular shape of an imaginary circle whose diameter is slightly smaller than the external diameter of the head portion 11. In this example, the head portion 11 can be entered between each leg portion 30 by pressing the marginal portion of the head portion 11 against said tilting surface 31a while elastically deforming the leg portion 30. Also, due to an elastic return of the leg portion 30 at the position wherein the marginal portion of the head portion 11 goes over the engagement claw 31, the valve body 3 and the float body 1 are coupled such that the engagement claw 31 is always positioned between the head portion 11 and the upper end face 10a of the main body portion 10. Specifically, in the illustrated example shown in FIG. 1 to FIG. 14, the engagement claw 31 of such valve body 3 functions as said engaging portion 8, and also the head portion 11 of the float body 1 functions as said engaged portion 8'.

In the descending position of the float body 1, the valve body 3 is supported by the head portion 11 of the float body 1. (FIG. 1) When the fuel flows into the housing chamber 20 constituting a part of the ventilation path R through said through holes 25, 61 and the like, the float body 1 and the valve body 3 ascend together and close the valve seat 23a. (Closed valve/FIG. 5) From this state, when the fuel outflows from the housing chamber 20, since the valve body 3 and the float body 1 are engaged and coupled in a state of allowing the valve body 3 to move upward and downward, when the float body 1 descends, the valve body 3 supported by this also descends so that the valve seat 23a is opened. As for the valve device in this mode of working, no engaging portion 8 is provided at a position opposite to a position where at least one engaging portion 8 among these engaging portions 8 is provided, relative the central axis x of the movement of the float body 1. Accordingly, if the float body 1 descends to the position wherein one engaging portion 8 is caught by the engaged portion 8', the valve body 3 is tilted with a side of the engaging portion 8 down, and on this side, in an early stage of the descending of the float body 1, the valve body 3 can be widely separated from the valve seat 23a. As a result, the fuel outflows from the housing chamber 20 and at the same time, the valve seat 23a is opened with an excellent responsiveness so that the fuel tank T can be aerated to the outside. (FIG. 6) Also, if the inside of the fuel tank T has a high pressure, the valve body 3 is pressed against the valve seat 23a so that there is a case that the valve body 3 is difficult to be unseated. However, even in such a case, due to the descending of the float body 1, the valve body 3 is tilted so that the valve seat 23a can be opened smoothly.

As shown in FIG. 15, plural projecting pieces 10b projecting upward may be provided on the upper end portion of the float body 1 such that the valve body 3 is housed inside. Also, an engagement claw 10c which faces an engaging surface 10d downward and becomes the engaging portion 8, may be formed in a portion of the plural projecting pieces 10b, so that the engagement claw 10c is caught by the marginal portion of the valve body 3 which becomes the engaged portion 8' from the upper side. Even if the valve body 3 and the float body 1 are coupled in a state wherein the valve body 3 can move upward and downward due to such plural projecting pieces 10b, the same function can be achieved. In this case, said leg portions 30 are not allowed be formed in the valve body 3.

Also, in this mode of working, the valve body 3 includes at least three engaging portions 8 constituted by the engagement claws 31 provided on the lower end side of the leg portions 30 projecting downward from the valve body 3, and the engagement claw 31 of one engaging portion 8 among the three engaging portions 8 is a tip-contacting engagement claw 31' positioned on the upper side from the engagement claws 31 of the other engaging portions 8.

No engaging portion 8 is provided at a position opposite to a position where the engagement portion 8 at the tip-contacting engagement claw 31' is provided, relative the central axis x of the movement of the float body 1.

A pitch between the engaging surface 31a of the tip-contacting engagement claw 31' and a lower surface 32 of the valve body 3 is larger than the up-down dimension of the head portion 11, and also smaller than a pitch between the engaging surface 31a of the rest of each engagement claw 31 and the lower surface 32 of the valve body 3. In the illustrated example, in a circular direction of the valve body 3, the leg portions 30 adjacent to the leg portion 30 with the tip-contacting engagement claws 31' become the rest of the engagement claws 31, respectively.

Thereby, in this mode of working, when the float body 1 descends, due to the engaging portion 8 which is the tip-contacting engagement claws 31', the valve body 3 seated on the valve seat 23a is acted by a force which tilts the valve body 3, so that the valve body 3 can be smoothly unseated. Also, due to the engaging portions 8 with the rest of the engagement claws 31, a coupled state of the valve body 3 and the float body 1 can be maintained.

Also, due to the engaging portions 8 except for the engaging portion 8 which becomes such a tip-contacting engagement claws 31', the valve body 3 cannot be tilted beyond a certain angle. As shown in FIG. 10 to FIG. 12, if the engaging surfaces 31a of the engagement claws 31 formed in the leg portions 30 adjacent to the leg portion 30 with the tip-contacting engagement claw 31' in the circular direction of the valve body 3, are formed in an tilted surface gradually extending obliquely upward as approaching to the tip-contacting engagement claw 31', the valve body 3 is most tilted in a state wherein the engaging surface 31a is totally contacted with the lower face of said head portion 11. (FIG. 10)

Also, in this mode of working, a latching leg portion 33 positioned on the side of the marginal portion of the head portion 11 of the float body 1 without having the engagement claw 31, is provided at a position opposite to a position where the tip-contacting engagement claw 31' is provided, relative the central axis x of the movement of the float body 1. A pitch between the inner face of the latching leg portion 33 and the tip of the engagement claw 31 of the tip-contacting engaging portion is made slightly smaller than the external diameter of the head portion 11.

Thereby, in this mode of working, while the valve body 3 is allowed to be tilted, the latching leg portion 33 is provided on the side opposite to the side wherein the tip-contacting engagement claw 31' is formed so that the tip-contacting engagement claw 31' cannot be disengaged from the head portion 11 which is the engaged portion 8' of the float body 1.

Also, in this mode of working, a pair of guide means 9 is provided on a side of the central axis x of the movement of the float body 1 so that when there is the tilt on the valve body 3, the valve body 3 and the float body 1 contact each other on a lower side of the tilt and due to the ascent of the float body 1, the guide means 9 correct the tilt. Also, when the float body 1 ascends, the float body 1 and the valve body 3 cannot contact each other in the rest of the portions.

In this mode of working, one of such a pair of guide means 9 is a projection 14 provided on the float body 1, and the other of the pair of guide means 9 is a depression 34 provided on the valve body 3 and housing this projection 14.

In the illustrated example, the upper part of said axial portion 11a of the head portion 11 of the float body 1 functions as the projection 14. Also, in the illustrated example, a circular projection 34a which is located on the lower surface 32 of the valve body 3 and whose inside is said depression 34 in the approximately center of the valve body 3, is formed. The internal diameter of this circular projection 34a is slightly larger than the external diameter of the upper part of the axis portion 11a, and the valve body 3 houses the axis portion 11a inside the circular projection 34a. The axis portion 11a contacts the surrounding lower surface 32 by the circular projection 34a so that the valve body 3 is supported on the top of the float body 1. In this state, the inner surface of the leg portion 30 of the valve body 3 cannot contact the marginal portion (in the illustrated example, the border of the outer border portion 11e of the circular jaw portion 11c) of the head portion 11 of the float body 1, and the outer surface of the circular projection 34a cannot contact a groove wall of said circular groove portion 11f. Also, the tip of the leg portion 30 cannot contact the upper end face 10a of the main body portion 10 of the float body 1. The upper end of the axial portion 11a is formed in a dome shape, and the valve body 3 is supported such that a deep inner portion 34b of the depression 34 focally contacts a top portion of the axial portion 11a.

When the float body 1 ascends due to the inflow of the fuel into the housing chamber 20, the valve body 3 also ascends. However, at this time, if there is the tilt on the valve body 3, the valve body 3 contacts one side of the valve seat 23a in advance, (FIG. 4) thereby, as a fulcrum of this side, the other side of the valve seat 23a is lifted up by the float body 1 so that the tilt of the float body 1 is corrected, and the valve body 3 is totally seated on the valve seat 23a. (FIG. 5) In this mode of working, since said guide means 9 are provided on the central axis x side of the movement of the float body 1, in the case that there is said tilt on the valve body 3, the valve body 3 and the float body 1 contact each other at a position close to said fulcrum without increasing a frictional force so that said tilt can be corrected. Concretely, by contacting a side face 14a of the projection 14 with the internal surface along the central axis x of the movement of the float body 1 in said depression 34, the tilt of said valve body 3 can be corrected (FIG. 4).

As shown in FIG. 13 and FIG. 14, said projection 14 may be constituted by plural projecting formation members 14c, 14c . . . disposed with a space 14d between adjacent projecting formation members 14c in a direction circling a projecting central axis 14b of the projection 14.

Also, as shown in FIG. 11, the inside of plural depression formation members 34c which are disposed in a circular shape such that there are spaces 34d between the adjacent depression formation members 34c, may be made as said depression 34.

In such a case, due to the spaces 14d, 34d between these formation members 14c, 34c, the fuel between the projection 14 and the depression 34 is prevented from remaining, so that a incident that the valve body 3 is stuck to the float body 1 due to the remaining fuel can be prevented.

Also, in this mode of working, a liquid extraction hole 11g is formed on the groove wall on the outer circumferential side of said circular groove portion 11f of the head portion 11 of the float body 1, (FIG. 7) so that due to this liquid extraction hole 11g, the fuel entered between the projection 14 and the depression 34 does not accumulate on the circular groove portion 11f.

Providing an elastic deformation characteristic to a portion wherein the elastic deformation characteristic should be provided in each component part of the above-explained valve device, can be assured by forming the component part by plastic molding.

Incidentally, the entire contents of the Specification, Claims, Drawings and Abstract of Japanese Patent Application No. 2007-117511 filed on Apr. 26, 2007 are cited here and are incorporated as a disclosure of the specification of the present invention.

What is claimed is:

1. A fuel tank valve device provided in a ventilation path communicating an inside and an outside of a fuel tank, comprising:
    a valve body having a circular plate shape and including an upper part, a circular projection projecting downwardly from the upper part, a plurality of leg portions extending downwardly from a periphery of the upper part, and a plurality of windows formed in the upper part corresponding to the leg portions;
    a float body provided with the valve body on an upper portion;
    a housing chamber which is formed in the ventilation path and houses the float body to be movable upward and downward; and
    a valve seat which is formed in the ventilation path and closes a valve by receiving a seating of said valve body by an ascent of the float body due to an inflow of fuel to the housing chamber,
    wherein the valve body and the float body are coupled so that the valve body moves in a direction along a central axis of movement of the float body and also the valve body becomes unseated when the float body descends,
    a pair of guide means is provided on a central axis side of the movement of the float body, and when the valve body tilts, the valve body and the float body contact each other at a lower side of a tilt of the valve body so that the guide means correct the tilt by the ascent of the float body, and when the float body ascends, the float body and the valve body do not contact each other except for a portion where the valve body and the float body contact each other.

2. A fuel tank valve device according to claim 1, wherein one of the pair of guide means is a projection provided at one of the float body and the valve body, and
    the other of the pair of guide means is a depression provided in the other of the float body and the valve body and housing the projection.

3. A fuel tank valve device according to claim 2, wherein the projection is constituted by a plurality of projecting formation members disposed with spaces between adjacent projecting formation members in a direction circling a projecting central axis of the projection.

4. A fuel tank valve device according to claim 2, wherein the depression is formed by depression formation members disposed in a circular shape with spaces between adjacent depression formation members.

5. A fuel tank valve device according to claim 1, wherein
the valve body and the float body are coupled respectively by engaging two or more engaging portions provided at one of the valve body and the float body with engaged portions provided at the other of the valve body and the float body in a state that the valve body moves upward and downward; and the engaging portion is not provided in a position opposite to a position, relative to the central axis of the movement of the float body, where at least one engaging portion is provided.

6. A fuel tank valve device according to claim 5, wherein
at least three engaging portions constituted by engagement claws provided on lower end sides of the leg portions projecting downward from the valve body are provided,
the engagement claw of one engaging portion among the three engaging portions is a tip-contacting engagement claw positioned at a position upper than the engagement claws of the other engaging portions, and the engaging portion is not provided in a position opposite to a position, relative to the central axis of the movement of the float body, where the engaging portion as the tip-contacting engagement claw is provided.

7. A fuel tank valve device according to claim 6, wherein the valve body is provided with a latching leg portion in a position opposite to a position where the tip-contacting engagement claw of the valve body is provided, relative to the central axis of the movement of the float body, so as to be located on a side of a side portion of the float body.

8. A fuel tank valve device according to claim 1, wherein the plurality of windows is formed circularly in the upper part with a space therebetween.

9. A fuel tank valve device according to claim 8, wherein the circular projection is formed within an inner side of the windows.

10. A fuel tank valve device according to claim 9, wherein a depression is formed inside the circular projection.

\* \* \* \* \*